(12) United States Patent
Mayer

(10) Patent No.: US 6,728,622 B2
(45) Date of Patent: Apr. 27, 2004

(54) METHOD AND ARRANGEMENT FOR CONTROLLING A DRIVE UNIT OF A VEHICLE

(75) Inventor: Rainer Mayer, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/299,846

(22) Filed: Nov. 20, 2002

(65) Prior Publication Data

US 2003/0120412 A1 Jun. 26, 2003

(30) Foreign Application Priority Data

Nov. 20, 2001 (DE) .......................................... 101 56 948

(51) Int. Cl.$^7$ ................................................ G06F 7/00
(52) U.S. Cl. ............................. 701/93; 701/87; 701/90; 477/166; 477/174
(58) Field of Search ................................. 701/1, 70, 87, 701/90, 93; 477/166, 174, 176; 123/350

(56) References Cited

U.S. PATENT DOCUMENTS

| | | | | |
|---|---|---|---|---|
| 5,628,706 A | * | 5/1997 | Zhang | 477/166 |
| 5,692,472 A | * | 12/1997 | Bederna et al. | 123/350 |
| 5,954,779 A | * | 9/1999 | Dietzel | 701/87 |
| 6,220,109 B1 | * | 4/2001 | Fischer et al. | 74/337.5 |
| 6,358,186 B1 | * | 3/2002 | Kosik et al. | 477/176 |

FOREIGN PATENT DOCUMENTS

DE 197 54 286 6/1999

\* cited by examiner

*Primary Examiner*—Gertrude A. Jeanglaude
(74) *Attorney, Agent, or Firm*—Walter Ottesen

(57) ABSTRACT

The invention is directed to a method and an arrangement for controlling a drive unit (1) of a motor vehicle. The method and arrangement reduce the lost motion of an operator-controlled element (5), which is actuable by the driver, up to an increase of the road speed of the vehicle beyond the road speed pregiven by the road speed controller (10). The degree of actuation (F) of the operator-controlled element (5) is detected and a desired value (S) for the torque of the drive unit (1) is formed from this degree of actuation (F). The desired value (S) for the torque is compared to a pregiven value (V) for the torque requested just then by the road speed controller (10). The torque of the drive unit (1) can only then approach the desired value (S) via control of the drive unit (1) when the desired value (S) exceeds the input value (V). The course of the desired value (S) for the torque is selected as a function of the degree of actuation (F) of the operator-controlled element (5) so that a pregiven value (VW) for the degree of actuation (F) of the operator-controlled element (5) is not exceeded at an intersect point (SP') of the course of the desired value (S) for the torque and the input value (V) just then requested by the road speed controller (10).

6 Claims, 3 Drawing Sheets

METHOD AND ARRANGEMENT FOR CONTROLLING A DRIVE UNIT OF A VEHICLE

BACKGROUND OF THE INVENTION

German patent publication 197 54 286 discloses a method and an arrangement for controlling a drive unit of a vehicle. Here, the degree of actuation of an operator-controlled element, which is actuable by the driver, is detected and a desired value for the torque of the drive unit is formed from this degree of actuation.

Furthermore, road speed controls are known which require a specific torque from the internal combustion engine for maintaining a desired speed of a vehicle. During the active operation of the road speed controller, if the driver wants to go faster than the set speed, for example, in order to initiate a passing operation, then the driver demands a higher torque from the engine by actuating the accelerator pedal. For this purpose, the driver must actuate the accelerator pedal so far that the required torque of the engine, which results therefrom, is greater than the torque required by the road speed controller. Up to this operating point of the accelerator pedal, there is therefore a lost motion or dead travel in the accelerator pedal with which the reaction of the vehicle is not changed.

SUMMARY OF THE INVENTION

The method of the invention and the arrangement of the invention for controlling a drive unit of a vehicle afford the advantage with respect to the foregoing: that the desired value for the torque is compared to an input value for the torque which is just then required by the road speed controller; that, with the control of the drive unit, the torque of the drive unit only then approaches the desired value when the desired value exceeds the input value; and that the trace of the desired value for the torque as a function of the degree of actuation of the operator-controlled element is so selected that a pregiven value for the degree of actuation of the operator-controlled element is not exceeded at an intersect point of the trace of the desired value for the torque and the input value required just then by the road speed controller. In this way, the lost motion or dead travel can be reduced with the actuation of the operator-controlled element up to exceeding the input value required by the road speed controller. The vehicle can then react more quickly to a driver command after increasing the torque beyond the input value required by the road speed controller, for example, to initiate a passing maneuver.

It is especially advantageous when the trace of the desired value for the torque drops below the input value by, at the most, a pregiven difference value. In this way, the pregiven value for the degree of actuation of the operator-controlled element can be realized with the least possible computation complexity via a simple displacement of a part of the characteristic line for the trace of the desired value.

BRIEF DESCRIPTION OF THE DRAWINGS

The invention will now be described with reference to the drawings, wherein.

DESCRIPTION OF THE PREFERRED EMBODIMENTS OF THE INVENTION

Figure 1:
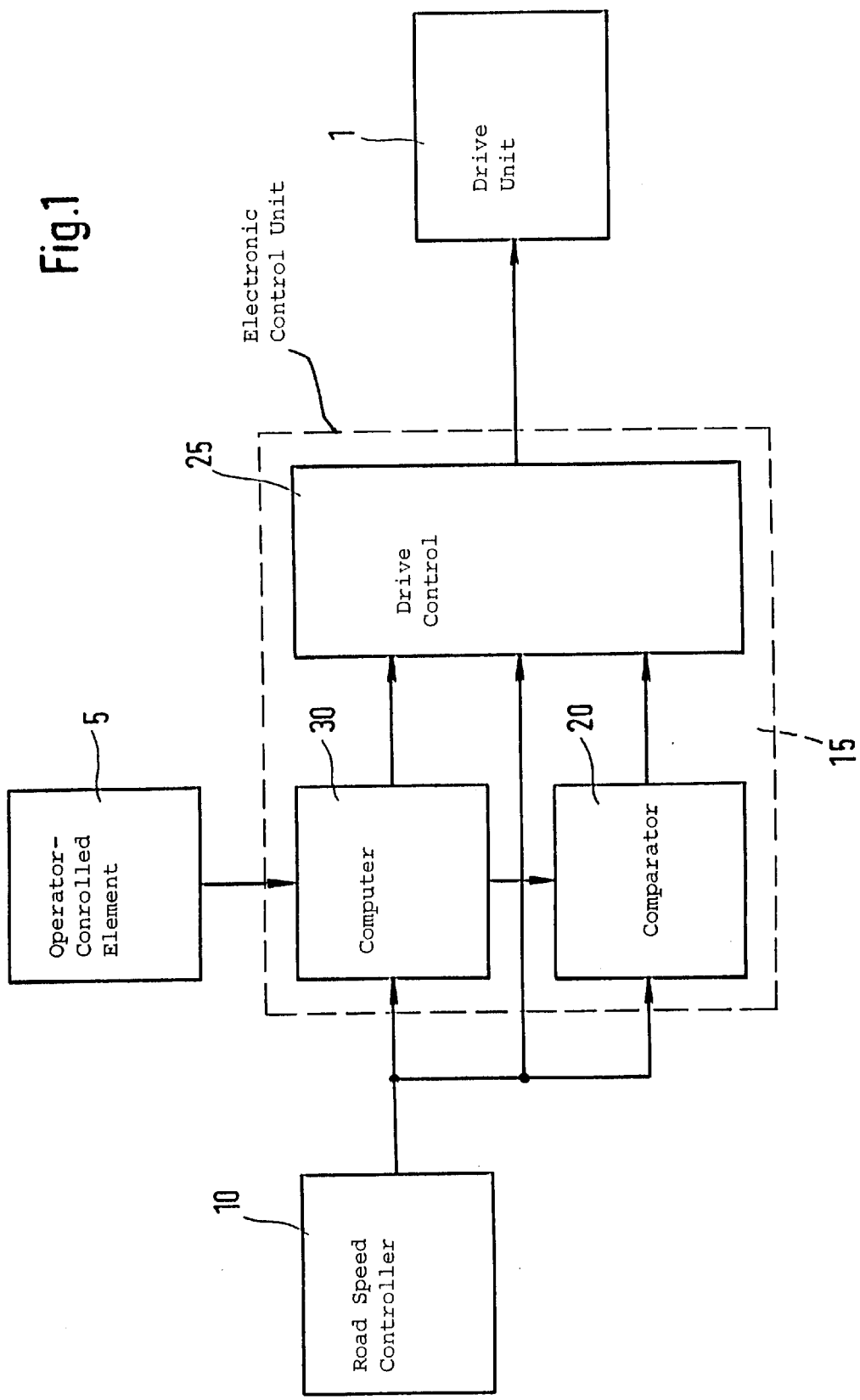
FIG. 1 is a block circuit diagram of an arrangement of the invention for controlling a drive unit of a vehicle.

In FIG. 1, reference numeral 15 identifies an electronic control unit for controlling a drive unit 1 of a vehicle. The electronic control unit 15 includes a drive control 25, comparison means 20 and computation means 30. The drive control 25 is, on the one hand, connected to the drive unit 1 and, on the other hand, to the comparison means 20 and the computation means 30. The comparison means 20 are connected to the computation means 30. A road speed controller 10 is connected to the following: the comparison means 20, the drive control 25 and the computation means 30. An operator-controlled element 5 is connected to the computation means 30.

In this embodiment, the operator-controlled element 5 is an accelerator pedal. A degree of actuation of the accelerator pedal 5 corresponds to an accelerator pedal position F. The accelerator pedal 5 continuously informs the computation means 30 as to the instantaneous accelerator pedal position F. In the computation means 30 or in a memory (not shown in FIG. 1) of the electronic control unit 15, a characteristic field K is stored for the course of a desired value S for the torque of the drive unit 1 as a function of the accelerator pedal position F of the accelerator pedal 5 (as shown, for example, in FIG. 3) and an additional operating variable such as the engine rpm or the vehicle road speed. The computation means 30 determine the corresponding desired value for the torque of the drive unit 1 from the instantaneous accelerator pedal position F, which is supplied by the accelerator pedal 5, based on this characteristic field K and transmit this desired value S to the drive control 25. The drive control 25 controls the drive unit 1 in such a manner that the torque of the drive unit 1 approaches the determined desired value S.

Figure 3:
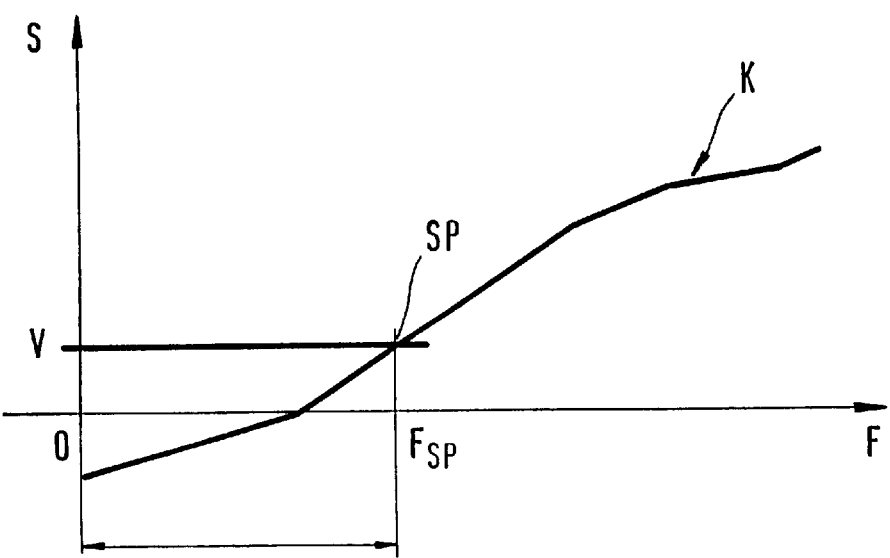
FIG. 3 shows a characteristic line of a trace of a desired value for the torque of a drive unit as a function of the degree of actuation of an operator-controlled element; and, FIG. 4 shows the adaptation of the course of the characteristic line for the desired value in accordance with the invention for obtaining a desired pregiven value for the degree of actuation of the operator-controlled element at the intersect point with a pregiven value required by a road speed controller.

If the road speed controller 10 is now activated, for example, because of a speed input by the driver of the vehicle, then the road speed controller 10 determines an input value V for the torque of the drive unit 1 in dependence upon the desired road speed. This input value V is likewise outputted to the computation means 30. FIG. 3 shows that the input value V intersects the characteristic field K for the desired value S with reference to a fixed second operating point at an intersect point SP. Intersect point SP corresponds to an accelerator pedal position $F_{SP}$. When the road speed controller 10 is active, it requests the drive control 25 to adjust the just then requested input value V for the torque at the drive unit 1. This has the consequence that an actuation of the accelerator pedal 5 up to the accelerator pedal position $F_{SP}$ has no effect because the desired value S for the torque of the drive unit 1 exceeds the input value V, which is requested by the activated road speed controller 10, only for an accelerator pedal position $F > F_{SP}$.

The desired value S for the torque of the drive unit 1 is determined by the computation means 30 from the accelerator pedal position F. In the comparison means 20, this desired value S is compared to the input value V requested by the road speed controller 10. Only for the case wherein the desired value S is greater than the input value V for an activated road speed controller 10, is the drive control 25 caused by the comparison means 20 so that the torque of the drive unit 1 no longer approaches the input value V requested by the road speed controller 10 but rather to approach the desired value S determined by the computation means 30. In this way, the driver, for example, is permitted to initiate a passing maneuver at a road speed which lies above the road speed to be set by the road speed controller 10.

According to the invention, for an activated road speed controller 10, the computation means 30 computes a new characteristic field K' from the input value V just requested by the road speed controller 10. With this new characteristic field K', a pregiven value VW for the accelerator pedal position F of the accelerator pedal 5 is not exceeded at an intersect point SP' of the trace of the desired value S for the torque with the pregiven value V just then requested by the road speed controller 10. The pregiven value VW can be fixedly preset in the computation means 30 or it can be supplied to the computation means 30 by means of an input unit (not shown in FIG. 1) of the electronic control unit 15.

Figure 4:
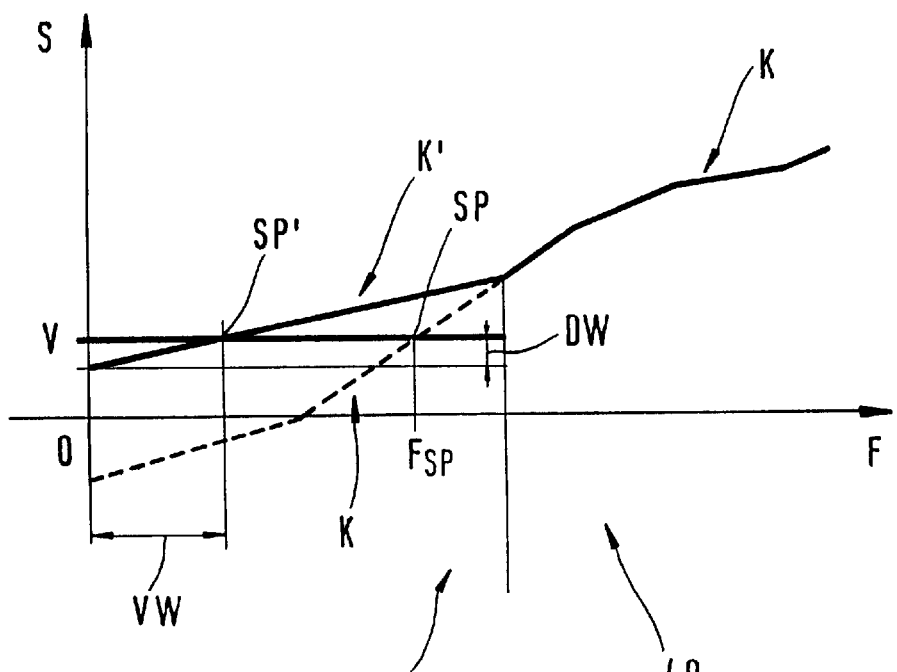

Via the pregiven value VW for the accelerator pedal position F, it can thereby be ensured that the lost motion of the accelerator pedal 5 is reduced up to a reaction of the vehicle in the form of an increase of the torque of the drive unit 1 beyond the pregiven value V. The vehicle thereby reacts more rapidly to a driver command after an increase of the road speed above the instantaneous road speed, which is to be adjusted by the road speed controller 10 instantaneously, for example, in order to initiate a passing maneuver. For this purpose, the characteristic field K is, for example, adapted by the computation means 30 to the input value V in accordance with FIG. 4. In the example of FIG. 4, the trace of the characteristic field K in a first region 35 is shifted in a coarse approximation upwardly to higher desired values S. The region 35 includes the zero position of the accelerator pedal 5. Approximately the same slope is achieved as in the original characteristic field K at least in the starting region proceeding from the zero position of the accelerator pedal 5. The original characteristic field K is shown by a broken line in the first region 35 of FIG. 4. In FIG. 4, the new characteristic field, which is adapted to the input value V, is identified by the reference character K' in the first region 35. The new characteristic field moves at the boundary between the first region 35 and a next adjacent second region 40 for larger accelerator pedal positions F into the original characteristic field K. From a comparison of FIGS. 3 and 4, it can be seen that the pregiven value VW is considerably smaller compared to the accelerator pedal position $F_{SP}$ at the original intersect pont SP of FIG. 3. The accelerator pedal position $F_{SP}$ and the original intersect point SP are plotted in FIG. 4 for the purposes of comparison. Because of the new characteristic field K' in the first region 35, there results a lesser lost motion of the accelerator pedal 5 compared to the original characteristic field K.

The formation of the new characteristic field K' in the first region 35 can take place in different ways. The objective is that the new characteristic field K' intersects the input value V at the new intersect point SP in order to realize the pregiven value VW so that the desired value S for the accelerator pedal positions F>VW exceeds the pregiven value V. Then it can, as shown in FIG. 4, be provided that the slope of the new characteristic field K' is approximately the same as the slope of the original characteristic field K in the region of the zero position of the accelerator pedal 5. With this slope known in the computation means 30, there results a pregiven difference value DW for realizing the pregiven value VW for the accelerator pedal position F of the accelerator pedal 5 by which the desired value S for the torque of the drive unit 1 at most is below the input value V and this is at the zero position of the accelerator pedal 5 as shown in FIG. 4.

The difference value DW can, for example, amount to approximately 10% of the requested input value V.

A further possibility for the formation of the new characteristic field K' comprises selecting a course for the new characteristic field K' which must satisfy the following conditions proceeding from the starting point of the original characteristic field K in the zero position of the accelerator pedal 5, namely:

1. to intercept the input value V in an accelerator pedal position F which corresponds to the pregiven value VW; and,
2. to pass over into the original characteristic field K at the boundary between the first region 35 and the second region 40.

Only the first-mentioned condition is significant for the realization of the invention. The new characteristic field K' for the accelerator pedal positions F<VW lies with its desired value S below the input value V. For accelerator pedal positions F>VW, the new characteristic field K' lies with its desired values S above the input value V. Purposefully, the new characteristic field K' is configured at least uniformly increasing and preferably greatly uniformly increasing in order to avoid unnecessary lost motion, above all, for accelerator pedal positions F<VW. Apart from these peripheral conditions, the course of the new characteristic field K' is, in principle, selectable as desired. Advantageously, the new characteristic field K' should, however, run linearly for accelerator pedal positions F<VW as well as for accelerator pedal positions F>VW and can, for example, have a break point at the new intersect point SP'. Then, a uniform driving performance can be realized for the driver. If the pregiven value VW is selected to be equal to zero, then a slight actuation of the accelerator pedal 5 by the driver leads to exceeding the demand of the road speed controller 10 and therefore to a higher road speed in comparison to the input of the road speed controller 10. In this way, a very nervous driving performance results because then the smallest accelerator pedal positions above the zero point immediately have the consequence of a disablement of the road speed controller 10. For this reason, the pregiven value VW is selected advantageously greater than zero in order to give the driver adequate play for the actuation of the accelerator pedal 5 up to exceeding the request of the road speed controller 10.

Figure 2:
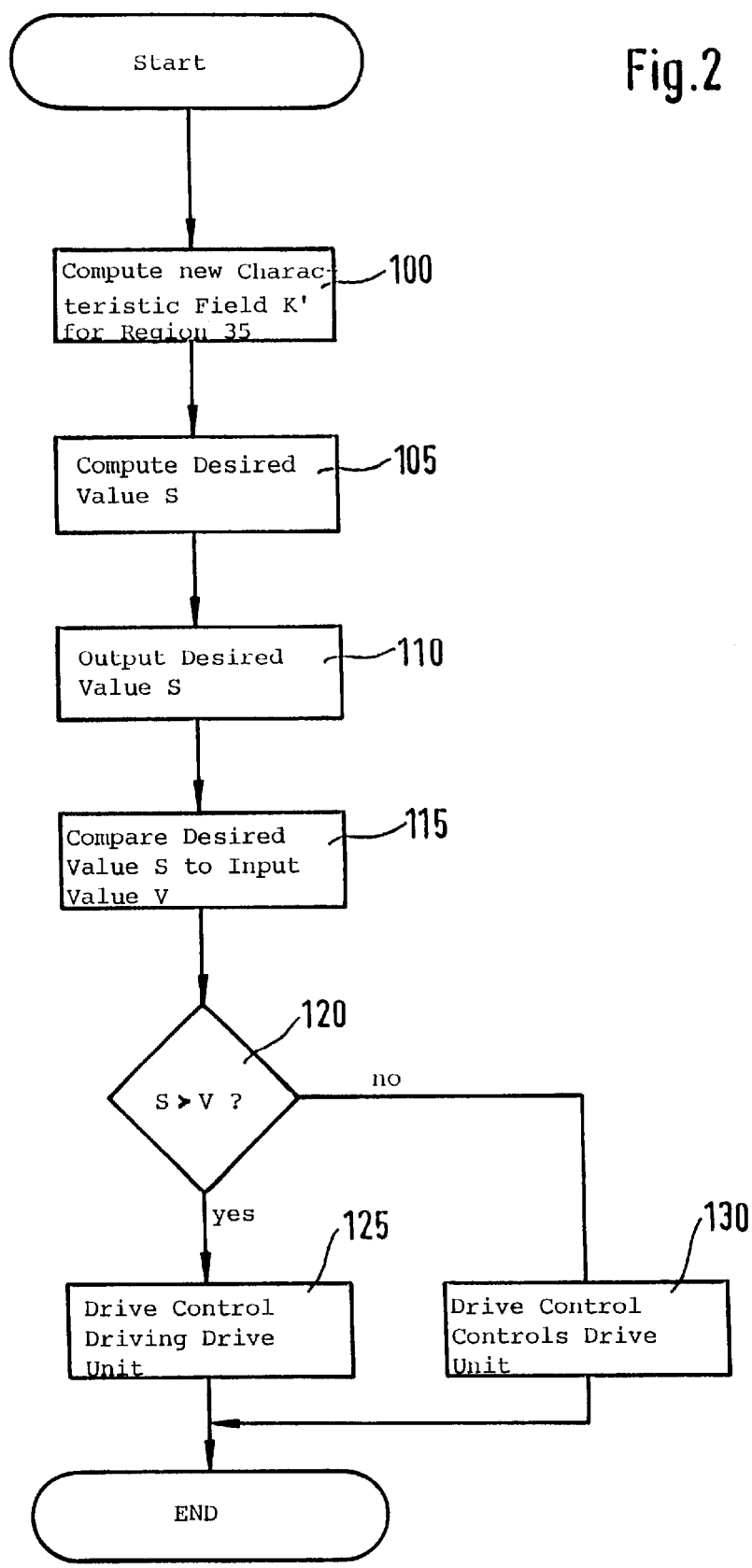
FIG. 2 is a sequence plan for the sequence of a method of the invention for controlling a drive unit of a vehicle.

A sequence plan for the method of the invention is shown in FIG. 2. After activating the road speed controller 10, the controller supplies to the drive control 25 the input value V requested for the torque of the drive unit 1. The drive control 25 thereupon triggers the drive unit 1 to cause the torque of the drive unit 1 to approach the input value V. The input value V is also supplied to the computation means 30. At a program point 100, the computation means 30 computes the new characteristic field K' for the first region 35 in the manner described with respect to FIG. 4, which characteristic field goes over into the original characteristic field K at the boundary between the first region 35 and the second region 40. The new characteristic field K' then intersects the input value V at an accelerator pedal position F, which corresponds to the pregiven value VW. Thereafter, the program branches to a program point 105. At program point 105, the computation means 30 determine the corresponding desired value S for the torque of the drive unit 1 from the instantaneous accelerator pedal position F, which is received from the accelerator pedal 5, based on the new characteristic field K' in the first region 35 and based on the original characteristic field K in the second region 40. Thereafter, there is a branching to program point 110. At program point 110, the computation means 30 outputs the determined desired value S to the comparison means 20. Thereafter, there is a branching to program point 115. At program point 115, the comparison means 20 compares the supplied desired value S to the input value V obtained from the road speed controller 10. Thereafter, there is a branching to program point 120. At program point 120, the comparison means 20 checks whether the desired value S is greater than the input value V. If this is the case, then there is a branching to program point 125; otherwise, there is a branching to program point 130. At program point 125, the comparison means 20 causes the drive control 25 to drive the drive unit 1 in such a manner that the torque of the drive unit 1 approaches the desired value S. Thereafter, the program is ended or is run through again for the next accelerator pedal position F received by the computation means 30. At program point 130, the comparison means 20 causes the drive control 25 to control the drive unit 1 in such a manner that the torque of the drive unit 1 approaches the pregiven value V. Thereafter, the program is ended or is again run through for the next accelerator pedal position F received by the computation means 30.

The described sequence can be organized via a control (not shown in FIG. 1) in the electronic control unit 15, which is connected to the computation means 30, the comparison means 20 and the drive control 25. The organization of the described sequence can be also assumed by the drive control 25.

According to FIG. 4, the minimum desired value S for the torque of the drive unit 1 is displaced on the original characteristic field K at the zero position of the accelerator pedal 5 to form the new characteristic field K' to a value just below the input value V, which lies below the input value V by the difference value DW.

It is understood that the foregoing description is that of the preferred embodiments of the invention and that various changes and modifications may be made thereto without departing from the spirit and scope of the invention as defined in the appended claims.

What is claimed is:

1. A method for controlling a drive unit of a vehicle which includes an operator-controlled element actuable by a driver of the vehicle, the method comprising the steps of:

detecting a degree of actuation (F) of said operator-controlled element;

forming a desired value (S) for the torque of said drive unit from said degree of actuation (F);

comparing said desired value (S) to an input value (V) for the torque of said drive unit which is just then requested by a road speed controller;

causing the torque of said drive unit to only then approach said desired value (S) when said desired value (S) exceeds said input value (V); and, selecting a course of said desired value (S) as a function of said degree of actuation (F) so that a pregiven value (VW) for said degree of actuation (F) is not exceeded at an intercept point (SP') of said course with said input value (V).

2. The method of claim 1, wherein said course of said desired value (S) drops below said input value (V) by at most a pregiven difference value (DW).

3. The method of claim 2, wherein said pregiven difference value (DW) is approximately ten percent of said input value (V).

4. An arrangement for controlling a drive unit of a vehicle which includes an operator-controlled element actuable by a driver of the vehicle, the arrangement comprising:

means for detecting the degree of actuation (F) of said operator-controlled element;

an electronic control unit including means for receiving said degree of actuation (F) and for determining a desired value (S) for the torque of said engine from said degree of actuation (F);

a road speed controller connected to said control unit;

a comparator for comparing said desired value (S) to an input value (V) for the torque of said drive unit which is just then requested by said road speed controller;

said control unit further including a drive control for controlling said drive unit so that the torque thereof only then approaches said desired value (S) when said desired value (S) exceeds said input value (V); and, computation means for adjusting a course of said desired value (S) as a function of said degree of actuation (F) so that at an intercept point (SP') of said course of said desired value (S) with said input value (V), a pregiven value (VW) for said degree of actuation (F) is not exceeded.

5. The arrangement of claim 4, wherein said course of said desired value (S) drops below said input value (V) by at most a pregiven difference value (DW).

6. The arrangement of claim 5, wherein said pregiven difference value (DW) is approximately ten percent of said input value (V).

* * * * *